United States Patent Office 2,988,554
Patented June 13, 1961

2,988,554
NEW NITROGENOUS EPOXIDE COMPOUNDS
Hans Batzer, Arlesheim, and Erwin Nikles, Basel, Switzerland, assignors to Ciba Limited, Basel, Switzerland
No Drawing. Filed Mar. 31, 1959, Ser. No. 803,086
Claims priority, application Switzerland Apr. 2, 1958
4 Claims. (Cl. 260—348)

This is a continuation in part of our copending application Serial No. 746,655 filed July 7, 1958, now abandoned.

This invention provides nitrogenous epoxide compounds of the general Formula I

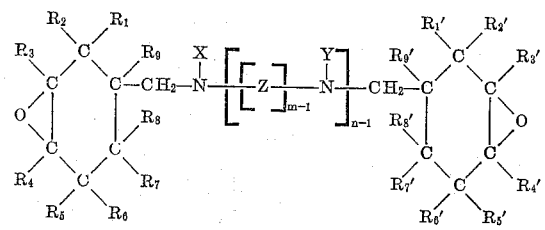

in which $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$ and $R_9'$ each represent a monovalent substituent, such as a halogen atom or an aliphatic, cycloaliphatic, araliphatic or aromatic hydrocarbon radical, especially a lower alkyl group having 1 to 4 carbon atoms, or a hydrogen atom, or $R_1$ and $R_5$ or $R_1'$ and $R_5'$ together represent a divalent substituent, such as a methylene group, X and Y each represent an acyl, carbalkoxy, carbaryloxy, carbamyl, cyano or sulfonyl group, Z represents a divalent organic radical which may be interrupted by functional groups or by heteroatoms, such as nitrogen, oxygen or sulfur atoms, and especially an alkylene or phenylene radical, $m$ is the whole number 1 or 2, and $n$ is a small whole number.

The invention also provides a process for the manufacture of the new compounds of the Formula I, wherein a compound of the general Formula II

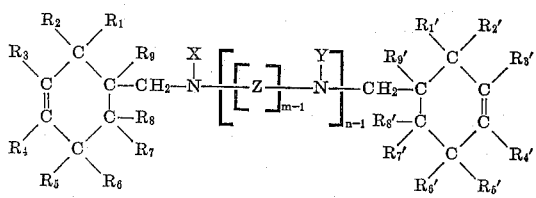

in which $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$, $R_9'$, X, Y, Z, $m$ and $n$ have the meanings given above, is treated with an epoxidizing agent, such as peracetic acid or perbenzoic acid.

The starting compounds of the Formula II can be obtained by reacting a secondary amine of that formula in which X and Y each represent a hydrogen atom, with an agent capable of introducing an acyl, carbalkoxy, carbaryloxy, carbamyl, cyano or sulfonyl group.

For introducing an acyl group there may be used, for example, a mono- or di-carboxylic acid or functional derivative thereof, such as an acid halide or more especially the acid anhydride.

The acyl group so introduced may be an acyl group of the formula

in which $A_1$ represents an aliphatic, cycloaliphatic, araliphatic or aromatic hydrocarbon radical which may be substituted or a heterocyclic radical; or the acyl group introduced may be of the formula

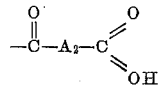

in which $A_2$ represents an aliphatic, cycloaliphatic, araliphatic, aromatic or heterocyclic radical which may be interrupted by functional groups or heteroatoms.

The introduction of a carbalkoxy or carbaryloxy group may be carried out, for example, by means of a halogen-formic acid ester. The carbalkoxy or carbaryloxy group may correspond, for example, to the formula

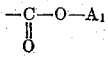

in which $A_1$ has the same meaning as it has in the acyl group of the formula

For introducing the carbamyl radical there may be used, for example, urea or an N-substituted urea capable of introducing with the splitting off of ammonia a radical of the formula

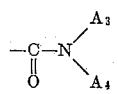

in which $A_3$ and $A_4$ may represent hydrogen atoms or aliphatic, cycloalphiatic, araliphatic, aromatic or heterocyclic radicals.

The introduction of the cyano group —C≡N may be carried out, for example, with a halogen cyanide, such as cyanogen bromide.

A sulfonyl group may be introduced, for example, by means of chlorosulfonic acid, a halogen-sulfuric acid ester or a sulfonic acid or functional derivative thereof, such as a sulfonic acid halide. The sulfonyl group may correspond, for example to the formula

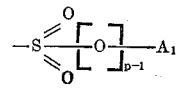

in which $A_1$ has the meaning given in connection with the acyl group of the formula

and $p$ represents the whole number 1 or 2.

The secondary amines corresponding to the compounds of the Formula II, that is to say, when X and Y each represent a hydrogen atom, can be made by various methods.

Thus, secondary monamines of the Formula III

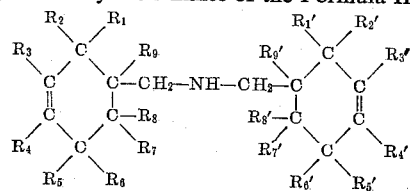

can be obtained by subjecting a compound or compounds of the Formula IV

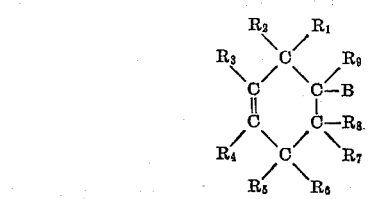

in which $R_1$, $R_2$, $R_3$, $R_4$, $R_5$, $R_6$, $R_7$, $R_8$ and $R_9$ have the meanings given above, and B represents a monovalent radical of the formulae

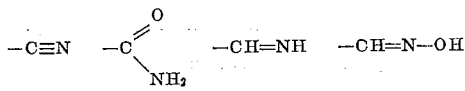

or

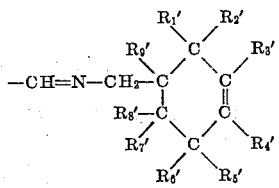

or the components forming it, to hydrogenation under conditions such that the carbon-to-carbon double bond in the cyclohexene ring is not saturated.

By suitably selecting the starting materials symmetrical or asymmetrical compounds of the Formula III can be obtained.

For example, symmetrical compounds of the Formula III are obtained by hydrogenating an imine, oxime, acid amide or especially a nitrile of the Formula IV or a Shiff's base of the Formula V

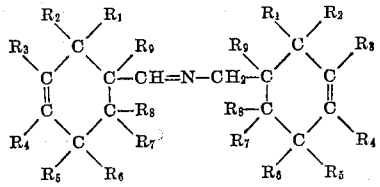

Such Schiff's bases are obtainable, for example, by condensing under reducing conditions 2 molecular proportions of an aldehyde of the Formula VI

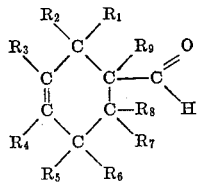

with one molecular proportion of ammonia. The Schiff's base so obtained may be used directly for making a symmetrical compound of the Formula III, that is to say without first isolating the Schiff's base, by subjecting a mixture of two molecular proportions of a compound of the Formula VI and about one molecular proportion of ammonia to hydrogenating conditions.

The Schiff's bases can also be obtained by reacting one molecular proportion of an amine of the Formula VII

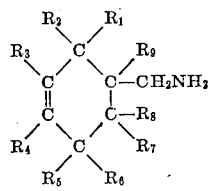

with one molecular proportion of an aldehyde of the Formula VI.

Especially easy to prepare are the secondary amines of the Formula VIII

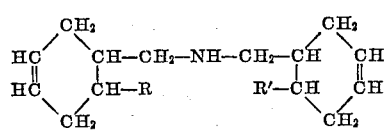

in which R and R' each represents a hydrogen atom or a lower alkyl group.

Bis-($\Delta^3$-tetrahydrobenzyl)-amine can be obtained by starting from $\Delta^3$-tetrahydrobenzonitrile, which can conveniently be obtained by the additive combination of acrylonitrile with butadiene.

Bis-(6-methyl-$\Delta^3$-tetrahydrobenzyl)-amine can be obtained by starting from ammonia and 6-methyl-$\Delta^3$-tetrahydrobenzaldehyde, the latter compound being conveniently obtained by the additive combination of crotonaldehyde with butadiene. Easily accessible also is bis-(1:5-endomethylene-$\Delta^3$-tetrahydrobenzyl)-amine.

Secondary diamines of the Formula IX

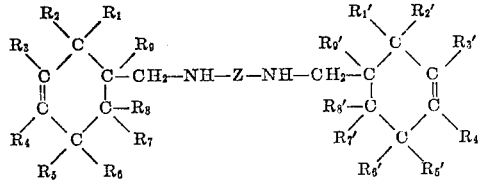

are obtained by subjecting a compound of the Formula X

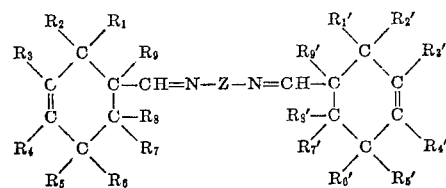

or a compound of the Formula XI

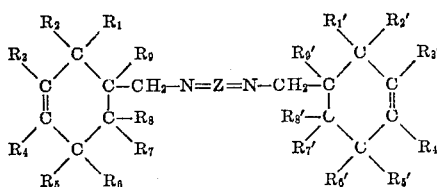

in which $R_1$–$R_9'$ and Z have the meanings given above, or the components forming such a compound, to hydrogenation under conditions such that the carbon-to-carbon double bond in the cyclohexene ring is not saturated.

The Schiff's bases of Formula X can be prepared by condensing 2 molecular proportions of an aldehyde of Formula VI with 1 molecular proportion of a diprimary diamine or polyamine, such as ethylene diamine, propylene diamine, hexamethylene diamine, diethylene triamine, triethylene tetramine, tetraethylene pentamine, diaminocyclohexane, phenylene diamine, benzidine, para:para'-diaminodiphenylmethane or para:para'-diaminodiphenyl sulfide, sulfone or oxide.

The Schiff's bases of Formula XI are obtainable by condensing 2 molecular proportions of an amine of Formula VII with 1 molecular proportion of a dialdehyde such, for example, as glyoxal, maleic aldehyde, succinic aldehyde, phthalic aldehyde or terephthalic aldehyde.

When a polyamine containing more than two primary amino groups is used (such as 1:2:3-triaminopropane or triaminobenzene) or a polyaldehyde containing more than two aldehyde groups there are obtained Schiff's bases, or from the latter by hydrogenation amines of Formula IX containing more than two cyclohexene radicals bound to two secondary amine nitrogen atoms, that is to say, in this case the radical Z is substituted by further radicals of the formula

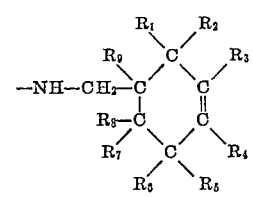

The hydrogenation of the compounds of Formulae

IV, X or XI can be carried out by a method of reduction known for hydrogenating —C≡N, —C=N— or

groups without at the same time hydrogenating the carbon-to-carbon double bond in the cyclohexene nucleus.

Such methods are, for example, reduction with sodium in an alcoholic medium, or reduction with lithium aluminum hydride.

For certain compounds, such as cyclohexene nitrile, there is also suitable catalytic hydrogenation in the presence of a catalyst such as Raney nickel or copper chromite.

The epoxidation of the carbon-to-carbon double bonds in the cyclohexene rings is carried out by a method in itself known, for example, with peracetic acid or perbenzoic acid.

The new epoxide compounds of Formula I react with the usual hardeners for epoxide compounds. Accordingly, they can be cross-linked or completely hardened by the addition of hardeners in a manner similar to that of other polyfunctional epoxide compounds or epoxide resins. As such hardeners there may be used basic or more especially acid compounds. There are suitable, for example, amines or amides, such as aliphatic or aromatic primary, secondary or tertiary amines, for example, mono-, di- or tri-butylamine, para-phenylene diamine, ethylene diamine, N:N-diethyl-ethylene diamine, diethylene triamine, triethylene tetramine, tetraethylene pentamine, trimethylamine, diethylamine, triethanolamine, Mannich's bases, piperidine, piperazine, guanidine or guanidine derivatives such as phenyl-diguanidine, di-phenyl-guanidine, dicyandiamide, aniline-formaldehyde resins, urea-formaldehyde resins, melamine-formaldehyde resins, polymers of aminostyrenes, polyamides, for example, those of aliphatic polyamines with dimerized or trimerized unsaturated fatty acids, isocyanates or isothiocyanates; polyhydric phenols, for example, resorcinol, hydroquinone, quinone, phenol-aldehyde resins, oil-modified phenol-aldehyde resins, reaction products of aluminum alcoholates or phenolates with compounds that react in tautomeric form of the type of the acetoacetic esters, Friedel-Crafts catalysts, for example, aluminum trichloride, antimony pentachloride, tin tetrachloride, ferric chloride, zinc chloride, boron trifluoride and complexes thereof with organic compounds; phosphoric acid. Preferred hardeners are polybasic carboxylic acids and anhydrides thereof, for example, phthalic anhydride, methyl-endomethylene-tetrahydrophthalic anhydride, dodecenyl-succinic anhydride, hexahydrophthalic anhydride, hexachloro-endomethylene-tetrahydrophthalic anhydride or mixtures thereof; maleic or succinic anhydride, if desired, together with an accelerator such as a tertiary amine.

The term "hardening" as used herein to denote the conversion of the epoxide compounds hereinbefore defined into insoluble and infusible resins.

There may incorporated with the new epoxide compounds, or mixtures thereof with hardeners, at any stage prior to hardening a filler, plasticiser, coloring matter or the like. Suitable extenders and fillers are, for example, asphalt, bitumen, glass fibers, mica, quartz meal, cellulose, kaolin, finely dispersed silicic acid "Aerosil" or metal powders.

The epoxide compounds of the invention, or mixtures thereof with hardeners, can be used in solution or emulsion with or without fillers, as textile assistants, laminating resins, lacquers, paints, immersion resins, casting resins, moulding compositions, brushing, filling or putty-like compositions, adhesives and the like, or they may be used in the manufacture of such products.

The following examples illustrate the invention, the parts and percentages being by weight.

EXAMPLE 1

*Preparation of bis-($\Delta^3$-tetrahydrobenzyl)-amine*

(a) 922 parts of $\Delta^3$-tetrahydrobenzonitrile are hydrogenated in a stirring autoclave at 131–132° C. and under an initial pressure of 140 atmospheres (gauge) in the presence of 40 parts of copper chromite. When 398,800 parts by volume of hydrogen (measured under normal conditions) have been taken up, the reduction is discontinued. The catalyst is filtered off and the filtrate distilled. After a fore-running containing $\Delta^3$-tetrahydrobenzylamine, there pass over at 162–164° C. under a pressure of 14 mm. Hg 580 parts of bis-($\Delta^3$-tetrahydrobenzyl)-amine. $n_D^{20}=1.5059$.

(b) A solution of 229 parts of $\Delta^3$-tetrahydrobenzylamine in 750 parts by volume of benzene is mixed with 227 parts of $\Delta^3$-tetrahydrobenzaldehyde in 750 parts by volume of benzene, whereupon evolution of heat and separation of water set in immediately. The mixture is raised to the boil and dehydrated in a circulation distillation apparatus as described by H. Batzer and co-workers in "Makromolekulare Chemie," 7 [1951], pages 84 and 85. The solvent is evaporated and the residue distilled in vacuo under a pressure of 11 mm. Hg. 382 parts (=92% of theory) of Schiff's base pass over at 147° C.

51.0 parts of the Schiff's base described above are dissolved in 188 parts of absolute alcohol and in the course of 30 minutes mixed with a total of 23.3 parts of sodium cut up into pieces of 3 to 4 grams each. The mixture is then refluxed until the sodium has completely dissolved. When the mass has cooled, it is poured into 500 parts of ice water. The separated oil is isolated, mixed with 160 parts by volume of 2N-sulfuric acid and subjected to steam distillation until 2000 parts of water have condensed. The distillate is discarded. The mixture is alkalinized with concentrated sodium hydroxide solution and extracted with ether, dried over sodium sulfate and evaporated, and the extract is distilled under 11 mm. Hg pressure. Between 152 and 157° C. 42.8 parts (=84% of theory) of bis-($\Delta^3$-tetrahydrobenzyl)-amine pass over.

(c) 54 parts of $\Delta^3$-tetrahydrobenzaldehyde are dissolved in 170 parts by volume of methanol and mixed with 7.7 parts of ammonium chloride in 25 parts of water and 26 parts by volume of ammonia of 25% strength, whereupon the mixture heats up and a precipitate is formed. In the presence of 13 parts of Raney nickel, at 56 to 65° C., under a hydrogen pressure of 70 to 120 atmospheres (gauge) hydrogenation is performed until the theoretical amount of hydrogen has been taken up. The catalyst is filtered off. The solvent is expelled and the residue is taken up in 500 parts by volume of ether and twice agitated with 200 parts by volume of 2N-sulfuric acid on each occasion. The acid aqueous solutions are combined, alkalinized with concentrated sodium hydroxide solution and twice extracted with 250 parts by volume of ether on each occasion. The ethereal extract is dried over sodium sulfate, evaporated, and the residue is distilled under 14 mm. Hg pressure. Between 60 and 70° C. 19 parts (=35% of theory) of $\Delta^3$-tetrahydrobenzylamine pass over and between 141 and 156° C. 24 parts (=47% of theory) of bis-($\Delta^3$-tetrahydrobenzyl)-amine.

*N:N-bis-(tetrahydrobenzyl)-formamide*

102.5 parts of bis-($\Delta^3$-tetrahydrobenzyl)-amine are boiled in a circulation distillation apparatus charged with sodium sulfate, with 300 parts by volume of benzene and 55 parts of formic acid of 85% strength until the distillate runs clear. The solvent and the surplus formic acid are removed in a water-jet vacuum, and the residue is distilled under a pressure of 0.2 mm. Hg, to yield 106 parts (=91% of theory) of N:N-bis-($\Delta^3$-tetrahydrobenzyl)-formamide boiling at 141° C. $n_D^{20}=1.5218$.

*Analysis.*—$C_{15}H_{23}ON$: Calculated—C, 77.20%; H, 9.94%. Found—C, 77.10%; H, 9.94%.

N:N-bis-(3:4-epoxy-hexahydrobenzyl)-formamide 93 parts of bis-($\Delta^3$-tetrahydrobenzyl)-formamide are dissolved in 400 parts by volume of benzene, 20 parts of anhydrous sodium acetate are added, and in the course of 31 minutes 180 parts of peracetic acid of 42% strength are added dropwise. The temperature is maintained at 29° C. by external cooling. After another 30 minutes at 29° C., 94% of the theoretical amount of peracetic acid have been consumed. The lower, aqueous phase is separated, and the benzolic phase is washed 3 times with 200 parts of water, 200 parts of 2N-sodium carbonate solution and 50 parts of monosodium phosphate solution. The aqueous fractions are extracted with twice 300 parts of benzene. The combined extracts are dried over sodium sulfate and then evaporated. The residue is dried in a high vacuum at 60 to 70° C. and yields 89 parts of epoxide. The product crystallizes after having been kept for some time. Epoxide content: 6.8 equivalents per kg. (=90% of theory).

45.0 parts of N:N-bis-(3:4-epoxy-hexahydrobenzyl)-formamide are mixed at 80° C. with 50.5 parts of methylendomethylene - tetrahydrophthalic anhydride, and the mixture is poured into an aluminum mould. After about 2 hours at 110° C. the mixture gelatinizes. The casting is hardened for 15 hours at 110° C., for 23 hours at 150° C., and for 13 hours at 200° C. It possesses the following mechanical properties:

Impact bending strength _____ 8.53 cm.kg./sq.cm.
Shape retention according to Martens_____ 149°.

EXAMPLE 2

N:N-bis-($\Delta^3$-tetrahydrobenzyl)-acetamide 75 parts of acetanhydride are stirred dropwise into 102.5 parts of bis-($\Delta^3$-tetrahydrobenzyl)-amine. The mixture heats up to 150° C. After 30 minutes at 140° C. the acetic acid formed and the surplus acetanhydride are distilled off in a water-jet vacuum. On distillation the residue yields 117.9 parts (=95% of theory) of bis-$\Delta^3$-tetrahydrobenzyl)-acetamide boiling at 134–136° C. under a pressure of 0.05 mm. Hg.

Analysis.—$C_{16}H_{25}ON$: Calculated—C, 77.68%; H, 10.19%. Found—C, 77.56%; H, 10.19%.

N:N-bis-(3:4-epoxy-hexahydrobenzyl)-acetamide 102 parts of bis - ($\Delta^3$ - tetrahydrobenzyl) - amine are mixed with 400 parts by volume of benzene, and while stirring and cooling with ice, 51 parts of acetanhydride are added dropwise in the course of 14 minutes. The temperature rises to 25° C. 30 parts of anhydrous sodium acetate are added, and in the course of 40 minutes 230 parts of peracetic acid of 42% strength are stirred in in portions. The temperature is maintained at 29° C. by cooling with ice. The cooling is then discontinued and the mixture is allowed to react again for 38 minutes at 29° C., at the end of which time 90% of the theoretical amount of peracetic acid have been consumed. The aqueous layer is separated and the benzolic phase is washed with 3 times 500 parts by volume of water, 400 parts by volume of 2N-sodium carbonate solution and 50 parts by volume of mono-sodium phosphate solution. The aqueous fractions are extracted with 500 parts by volume of benzene. The extracts are combined and evaporated and yield 95 parts of a thickly viscous resin which contains 6.33 epoxide equivalents per kg. (=89% of theory).

HARDENING TEST 39 parts of fused phthalic anhydride are mixed at about 110° C. with 47.5 parts of N:N-bis-(3:4-epoxy-hexahydrobenzyl)-acetamide. The mixture is introduced into an aluminum mold and hardened for 45 hours at 150° C. The casting possesses the following physical properties:

Bending strength _____ 6.03 kg./sq. mm.
Impact bending strength _____ 5.84 cm. kg./sq. cm.
Shape retention according to Martens (DIN) _____ 190°.

EXAMPLE 3

N:N-bis-($\Delta^3$-tetrahydrobenzyl)-para-toluenesulfonamide

A mixture of 205 parts of bis-($\Delta^3$-tetrahydrobenzyl)-amine in 300 parts by volume of ethylene chloride and 500 parts by volume of 2N-sodium hydroxide solution is treated dropwise with vigorous stirring with a solution of 191 parts of para-toluenesulfonyl chloride in 500 parts by volume of ethylene chloride. The temperature is maintained at 10° C. by cooling with ice. After 2 hours at room temperature the aqueous layer is separated and extracted with 200 parts by volume of ethylene chloride. The extracts are washed with twice 100 parts by volume of 0.5N-sodium hydroxide solution, dried over sodium sulfate and evaporated in vacuo, to yield 358.2 parts (=99.7% of theory) of N:N-bis-($\Delta^3$-tetrahydrobenzyl) - para - toluenesulfonamide melting at 87–89.5° C. After having been crystallized 3 times from methanol the product melts at 95 to 96° C.

Analysis.—$C_{21}H_{29}O_2NS$: Calculated—C, 70.16; H, 8.13; S, 8.92%. Found—C, 70.14; H, 8.40; S, 8.84%.

N:N-bis-(3:4-epoxy-hexahydrobenzyl)-para-toluenesulfonamide 358 parts of the above para-toluenesulfonamide are dissolved in 1500 parts by volume of ethylene chloride and mixed with 50 parts of anhydrous sodium acetate. While cooling with ice, 450 parts of peracetic acid of 42% strength are stirred in dropwise at 30° C. within 45 minutes. The mixture is maintained at 30° C. for a further 75 minutes by occasional cooling. After that time, 97% of the theoretical amount of peracetic acid have been consumed. The solution is washed with 3 times 500 parts by volume of water and with twice 200 parts by volume of 2N-sodium carbonate solution, dried over sodium sulfate and then evaporated. Yield: 375 parts of crystalline epoxide. The product contains 4.72 epoxide equivalent per kg. (=92.3% of theory).

For analysis the product is crystallized three times from methanol and melts then at 131 to 132° C.

Analysis.—$C_{21}H_{29}O_4NS$: Calculated—C, 64.42; H, 7.46; O, 16.35%. Found—C, 64.67; H, 7.66; O, 16.02%.

CASTING 56 parts of the fused epoxide are mixed at about 130° C. with 32 parts of phthalic anhydride and introduced into an aluminum mould. The mixture gelatinises after 43 minutes at 150° C. The casting is hardened for 45 hours at 150° C. Its Martens value (shape retention: DIN) is 138°.

EXAMPLE 4

N:N-bis-($\Delta^3$-tetrahydrobenzyl)-urethane 102.5 parts of bis-($\Delta^3$-tetrahydrobenzyl)-amine are dissolved in 400 parts by volume of ethylene chloride and mixed with 250 parts by volume of 2N-sodium carbonate solution. While cooling and stirring vigorously, 56 parts of ethyl chloroformate are added dropwise within 30 minutes at 5 to 7° C. While keeping the mixture stirred, it is then allowed to rise to room temperature. The ethylene chloride is separated and the aqueous layer (pH=6) is extracted with 250 parts by volume of ethylene chloride. The extracts are combined, dried over sodium sulfate and evaporated. On distillation the residue yields 119.5 parts (=86% of theory) of N:N-bis-($\Delta^3$-tetrahydrobenzyl)-urethane boiling at 131–136° C. under a pressure of 0.02 mm. Hg. $n_D^{20}$=1.5006.

Analysis.—$C_{17}H_{27}O_2N$: Calculated—C, 73.60; H, 9.81; N, 5.05%. Found—C, 73.6; H, 9.7; N, 5.2%.

N:N-bis-(3:4-epoxy-hexahydrobenzyl)-urethane 108 parts of N:N-bis-($\Delta^3$-tetrahydrobenzyl)-urethane are dissolved in 500 parts by volume of benzene and mixed with 20 parts of sodium acetate. While cooling and stirring, 200 parts of peracetic acid of 42% strength are then added dropwise within 30 minutes at 30° C. and the whole is then maintained for 2 hours at 30° C. After that time 97% of the theoretical amount of peracetic acid have been consumed.

The benzolic solution is washed 3 times with 150 parts of ice water and twice with 150 parts by volume of dilute sodium carbonate solution on each occasion. The aqueous fractions are extracted with 250 parts by volume of benzene. The extracts are combined, dried over sodium sulfate and evaporated, to yield a water-clear resin containing 5.67 epoxide equivalents per kg. (=87.7% of theory).

EXAMPLE 5

N:N-bis-($\Delta^3$-tetrahydrobenzyl)-cyanamide 102.5 parts of bis-($\Delta^3$-tetrahydrobenzyl)-amine are dissolved in 400 parts by volume of ethylene chloride and covered with 250 parts by volume of 2 N-sodium carbonate solution. While cooling and stirring well, a solution of 54 parts of cyanogen bromide in 200 parts by volume of ethylene chloride is added dropwise at −2° to +2° C. within 15 minutes, and while keeping the mixture stirred it is allowed to rise to room temperature. The aqueous layer then has a pH value of 6.

The ethylene chloride is separated, and the aqueous phase is extracted with 200 parts by volume of ethylene chloride. The extracts are combined, dried over sodium sulfate, evaporated and distilled. 93.7 parts (=85% of theory) of N:N-bis-($\Delta^3$-tetrahydrobenzyl)-cyanamide pass over between 144 and 148° C. under a pressure of 0.04 mm. Hg. $n_D^{20}$=1.5157.

Analysis.—$C_{15}H_{22}N_2$: Calculated—C, 78.21; H, 9.63; N, 12.16%. Found—C, 78.07; H, 9.83; N,11.91%.

N:N-bis-(3:4-epoxy-hexahydrobenzyl)-cyanamide 85.0 parts of bis-($\Delta^3$-tetrahydrobenzyl)-cyanamide are dissolved in 300 parts by volume of benzene. 20 parts of sodium acetate are added and while cooling and stirring 190 parts of peracetic acid of 42% strength are added, in portions, at 30° C. within 33 minutes. After another 60 minutes at 30 to 28° C., 96% of the theoretical amount of peracetic acid have been consumed. The benzolic phase is washed with 3 times 100 parts by volume of water and twice 100 parts by volume of sodium carbonate solution. The aqueous fractions are extracted with 250 parts by volume of benzene. The extracts are combined and evaporated and yield 77.0 parts (=80% of theory) of a water-clear resin containing 6.76 epoxide equivalents per kg. (=88.6% of theory).

EXAMPLE 6

Di-Schiff's base from $\Delta^3$-tetrahydrobenzaldehyde and ethylenediamine 31 parts of ethylenediamine are mixed in 200 parts by volume of benzene with 118 parts of $\Delta^3$-tetrahydrobenzaldehyde of 93% strength. The mixture immediately eliminates water. It is heated to the boil and dehydrated in a circulation distillation apparatus. The solution is then evaporated and the residue distilled in a high vacuum. 107 parts (=88% of theory) of the di-Schiff's base pass over between 117 and 126° C. under a pressure of 0.01 mm. $n_D^{20}$=1.5177.

Analysis.—$C_{18}H_{24}N_2$: Calculated—C, 78.63; H, 9.90; N, 11.46%. Found—C, 78.84; H, 10.19; N, 11.14%.

N:N'-bis-($\Delta^3$-tetrahydrobenzyl)-ethylenediamine 122 parts of the di-Schiff's base described above are dissolved in 800 parts of absolute alcohol and treated in portions with a total of 92 parts of sodium, whereupon the mixture begins to boil. Towards the end of the reaction another 100 parts of alcohol are added and the mixture is boiled until all sodium has dissolved. After cooling, 1750 parts of water are added, the separated oil is isolated, and the aqueous fractions are extracted twice with 250 parts by volume of benzene. The extract is combined with the oil, dried over sodium sulfate and evaporated. Distillation of the residue in a high vacuum (0.05 to 0.08 mm. Hg) produces 102 parts (=82% of theory) of N:N'-bis-($\Delta^3$-tetrahydrobenzyl)-ethylenediamine boiling at 132 to 142° C. $n_D^{20}$=1.5092.

Analysis.—$C_{16}H_{28}N_2$: Calculated—C, 77.36; H, 11.36; N, 11.28%. Found—C, 77.46; H, 11.26; N, 11.40%.

N:N'-diacetyl-N:N'-bis-($\Delta^3$-tetrahydrobenzyl)-ethylenediamine 99 parts of N:N'-bis-($\Delta^3$-tetrahydrobenzyl)-ethylenediamine are mixed with cooling with 90 parts of acetanhydride. The acetic acid formed is expelled in a water-jet vacuum and the residue distilled in a high vacuum. At about 200° C. (under a pressure of 0.07 mm. Hg) 102 parts of an extremely viscous liquid pass over which crystallizes slowly when allowed to stand for a prolonged time.

Analysis. — $C_{20}H_{32}O_2N_2$: Calculated — N, 8.43%. Found—N, 8.53%.

N:N'-diacetyl-N:N'-bis-(3:4-epoxy-hexahydrobenzyl)-ethylenediamine 33 parts of the above product are dissolved in 200 parts by volume of benzene. At about 20° C., 840 parts by volume of a solution of 19 parts peracetic acid in benzene are added dropwise. The mixture is slowly heated to 27° C. and after 7 hours washed with twice 200 parts by volume of ice-cold N-sodium carbonate solution and then with 200 parts by volume of saturated sodium chloride solution, dried over sodium sulfate, and evaporated.

The resulting epoxy resin (25 parts) can be recrystallized from carbon tetrachloride with cooling. Melting point: 128 to 129° C.

It can be hardened in the following manner to form a casting: 2.33 parts of the epoxy resin, 1.26 parts of phthalic anhydride and 0.05 part of bis-($\Delta^3$-tetrahydrobenzyl)-methylamine as hardening accelerator are melted, thoroughly mixed and introduced into a mould. After 15 minutes at 150° C. the mass has gelatinized and has become completely hard after another 30 minutes.

The bis-($\Delta^3$-tetrahydrobenzyl)-methylamine used as hardening accelerator can be prepared in the following manner: 51 parts of bis-($\Delta^3$-tetrahydrobenzyl)-amine are dissolved in 32 parts of formic acid of 90% strength while cooling with ice. The mixture is treated with 24 parts of formaldehyde solution of 36.6% strength and heated to 50° C., whereupon within 20 minutes a strong evolution of gas takes place. The mixture is then kept for 14 hours at 100° C. 200 parts by volume of 2 N-hydrochloric acid are added, and the whole is subjected to steam distillation until 2000 parts of water have passed over. The mixture is rendered alkaline with 100 parts by volume of concentrated sodium hydroxide solution and extracted 3 times with 500 parts of ether on each occasion. The ethereal solution is then dried over anhydrous potassium carbonate, evaporated, and the residue is distilled under a pressure of 11 mm. Hg. Between 147 and 159° C., 46 parts of bis-($\Delta^3$-tetrahydrobenzyl)-methylamine pass over. The combustion analysis of the distillate yields the following data.—$C_{15}H_{25}N$: Calculated—C, 82.13; H, 11.49; N, 6.38%. Found—C, 82.21; H, 11.59; N, 6.53%.

EXAMPLE 7

*Di-Schiff's base from $\Delta^3$-tetrahydrobenzaldehyde and hexamethylenediamine*

58 parts of hexamethylenediamine in 200 parts by volume of benzene are mixed with 118 parts of $\Delta^3$-tetrahydrobenzaldehyde of 93% strength. The eliminated water is removed in a circulation distillation apparatus. The solvent is expelled and the residue distilled at 154–159° C. under a pressure of 0.05 mm. Hg. Yield: 144 parts (=96% of theory). $n_D^{20}$=1.5074.

Analysis.—$C_{20}H_{32}N_2$: Calculated—C, 79.94; H, 10.74; N, 9.32%. Found—C, 79.55; H, 10.82; N, 9.48%.

*N:N'-bis-($\Delta^3$-tetrahydrobenzyl)-hexamethylenediamine*

525 parts of the Schiff's base described above are mixed with 3800 parts by volume of absolute alcohol. A total of 325 parts of sodium metal in pieces of about 4 grams is then gradually added with stirring, whereupon the mixture heats up. Towards the end of the reaction the mixture is refluxed to achieve complete dissolution of the sodium, allowed to cool, treated with 4000 parts of water, the separated oil is removed, and the aqueous phase is extracted twice with 500 parts by volume of benzene on each occasion. The extract is combined with the oil and dehydrated in a circulation distillation apparatus. The benzene is then evaporated and the residue distilled, to yield 440 parts of N:N'-bis-($\Delta^3$-tetrahydrobenzyl)-hexamethylenediamine passing over between 150 and 160° C. under a pressure of 0.05 mm. Hg. $n_D^{20}$=1.5032.

Analysis.—$C_{20}H_{36}N_2$: Calculated C, 78.88; H, 11.92; N, 9.20%. Found—C, 78.55; H, 11.90; N, 9.27%.

*N:N'-diacetyl-N:N'-bis-(3:4-epoxy-hexahydrobenzyl)-hexamethylenediamine*

430 parts of N:N'-bis-(tetrahydrobenzyl)-hexamethylenediamine are dissolved in 2000 parts by volume of benzene. 289 parts of acetanhydride are added dropwise while maintaining the mixture at 15 to 38° C. by cooling with ice. 60 parts of anhydrous sodium acetate are then added, and in the course of 42 minutes 600 parts of peracetic acid of 42% strength are added in portions. By cooling, the temperature is maintained at 30° C. After another 2 hours at 32° C. the benzolic phase is washed with 3 times 500 parts by volume of water, 3 times 500 parts by volume of 2 N-sodium carbonate solution and finally with 50 parts by volume of 1-molecular monosodium phosphate solution. The aqueous fractions are extracted with 750 parts by volume of benzene, the extracts are combined, dried over sodium sulfate and evaporated. Yield: 478 parts of a product containing 4.26 epoxide equivalents per kg. (=89.5% of theory).

PREPARATION OF A CASTING 46.6 parts of epoxide are mixed at 95° C. with 30.2 parts of methyl-endomethylene-tetrahydrophthalic anhydride and introduced into an aluminum mould. The mixture gelatinizes after 155 minutes at 150° C. After having been hardened for 40 hours at 150°, the casting possesses the following mechanical properties:

Bending strength at 50° C. _____ 11.39 kg./sq. mm.
Impact bending strength _____ 12.27 cm. kg./sq. cm.

EXAMPLE 8

*N:N'-bis-($\Delta^3$-tetrahydrobenzyl)-hexamethylene-diurethane*

61 parts of N:N'-bis-($\Delta^3$-tetrahydrobenzyl)-hexamethylenediamine are dissolved in 200 parts by volume of ethylene chloride and covered with 250 parts by volume of 2 N-sodium carbonate solution. While stirring the mixture well, 50 parts of ethyl chloroformate are added dropwise at 0 to 10° C., whereupon a precipitate is formed. On completion of the addition of ethyl chloroformate, the whole is stirred on for 1 hour, 1000 parts by volume of ethyl acetate are added, and the aqueous layer is separated. The solution is washed with 100 parts each of 2 N-sodium carbonate solution and saturated sodium chloride solution, dried over sodium sulfate and evaporated. On being distilled at about 200° C. under a pressure of 0.04 mm. Hg, the residue yields 66 parts of N:N'-bis-($\Delta^3$-tetrahydrobenzyl)-hexamethylene-diurethane.

Analysis.—$C_{26}H_{44}O_4N_2$: Calculated—C, 69.60; H, 9.89; N, 6.24%. Found—C, 69.1; H, 9.8; N, 6.5%.

*N:N'-bis-(3:4-epoxy-hexahydrobenzyl)-hexamethylene-diurethane*

57.5 parts of N:N'-bis-($\Delta^3$-tetrahydrobenzyl)-hexamethylenediurethane are dissolved in 300 parts by volume of benzene. While stirring and cooling, 60 parts of peracetic acid of 42% strength are added within 13 minutes in the presence of 5 parts of sodium acetate, and the mixture is allowed to react for 1 hour at 30° C., by which time 81% of the theoretical amount of peracetic acid have been consumed. The organic phase is washed 3 times with 100 parts by volume of ice water and twice with 100 parts of dilute sodium carbonate solution on each occasion. The aqueous fractions are extracted with 250 parts by volume of benzene. The extracts are combined, dried and evaporated, to yield 54.2 parts of diepoxide containing 3.85 epoxide equivalents per kg.

EXAMPLE 9

*Di - Schiff's base from $\Delta^3$ - tetrahydrobenzaldehyde and phenylenediamine*

108 parts of para-phenylenediamine in 500 parts by volume of benzene are mixed with 238 parts of $\Delta^3$-tetrahydrobenzaldehyde of 93% strength and dehydrated in a circulation distillation apparatus. The benzene is then distilled off and the residue distilled at about 200° C. under a pressure of 0.03 mm. Hg. Yield: 241 parts (=82% of theory). The product solidifies on cooling.

*N:N'-bis-($\Delta^3$-tetrahydrobenzyl)-para-phenylenediamine*

73 parts of the di-Schiff's base described above are dissolved in 500 parts by volume of absolute alcohol. 46 parts of sodium are gradually added to the solution. Another 200 parts by volume of absolute alcohol are added, and the whole is boiled until the sodium has dissolved completely. During the reaction the product separates out in droplet form. After cooling, 500 parts by volume of benzene and 2000 parts of water are added. The aqueous layer is separated. The organic phase is evaporated and the residue is distilled at about 200° C. under a pressure of 0.05 mm. Hg, to yield 56 parts of N:N'-bis-($\Delta^3$-tetrahydrobenzyl) - para-phenylenediamine which crystallizes immediately. The product can be crystallized from cyclohexane. Melting point 96° C.

Analysis.—$C_{20}H_{28}N_2$: Calculated—C, 81.03; H, 9.52; N, 9.45%. Found—C, 81.19; H, 9.62; N, 9.27%.

*N:N'-diacetyl-N:N'-bis-(3:4-epoxy-hexahydrobenzyl)-para-phenylenediamine*

50.3 parts of N:N'-bis-(tetrahydrobenzyl)-para-phenylenediamine are dissolved in 300 parts by volume of benzene. 35.0 parts of acetanhydride are then added, and the mixture is boiled for 15 minutes, cooled to 30° C., treated with 10 parts of sodium acetate and epoxidized for 40 minutes at 30 to 35° C. with 75 parts of peracetic acid of 42% strength. The product is worked up as described in the preceding examples. Yield: 63.4 parts of a crystalline product containing 3.36 epoxide equivalents per kg.

EXAMPLE 10

*N:N-bis($\Delta^3$-tetrahydrobenzyl)-stearamide*

A well-stirred mixture of 102.5 parts of N:N'-bis-($\Delta^3$-tetrahydrobenzyl)-amine in 400 parts by volume of ethylene chloride and 53 parts of anhydrous sodium carbonate, dissolved in 400 parts by volume of water, is mixed dropwise at 7 to 13° C. within 27 minutes with 152 parts of stearic acid chloride. The whole is stirred on for 3 hours at room temperature. The aqueous phase has a pH value of 7. The bottom phase (ethylene chloride) is separated, washed with twice 200 parts by volume of 2N-nitric acid and 100 parts by volume of 2N-potassium bicarbonate solution, dried over sodium sulphate and evaporated. The product (236 parts=100% of theory) crystallizes partially.

*N:N-bis-(3:4-epoxy-hexahydrobenzyl)-stearamide*

100 parts of N:N-bis($\Delta^3$-tetrahydrobenzyl)-stearamide are dissolved in 500 parts by volume of benzene. While stirring the mixture, 11 parts of anhydrous sodium acetate and, in the course of 10 minutes at 30° C., 110 parts of peracetic acid of 42% strength are added in portions. After another 85 minutes at 28 to 33° C., the aqueous phase is separated. The benzolic phase is washed with water and with 2N-sodium carbonate solution to remove all acids. The solution is dried over sodium sulfate and evaporated, to yield 103 parts of a crystalline product containing 3.25 epoxide equivalents per kg.

EXAMPLE 11

*Stability to solvents*

(A) 0.50 part of boron trifluoride-ethylamine complex is dissolved in 20 parts of N:N-bis-(3:4-epoxy-hexahydrobenzyl)-acetamide at about 100° C. The mixture is poured into a tin mould (4 x 1 x 1 cm.) and heated to 150° C. After 60 minutes gelatinization sets in. The casting is then hardened for 40 hours at 150° C.

(B) In an identical manner castings are prepared from 6:6'-dimethyl-3:4-epoxy-hexahydrobenzyl-3':4'-epoxy-hexahydrobenzoate. The mixture gelatinizes within 6 minutes.

The resulting castings are immersed in different solvents. The castings prepared as described under (B) swell rapidly (increase in weight) and then disintegrate (loss in weight), whereas the castings prepared as described under (A) remain unchanged and do not reveal any superficial damage. The following table lists the increase and decrease respectively in the weight of the castings:

| Casting prepared as under— | Solvent | Initial weight, milligrams | Weight after— | | | |
|---|---|---|---|---|---|---|
| | | | 32 mins. | 83 mins. | 165 mins. | 18 hours |
| A | chloroform | 3,353 | 3,353 | 3,353 | 3,353 | 3,355 |
| B | do | 3,881 | ¹3,949 | 3,904 | 3,676 | 720 |
| A | acetone | 3,640 | | | 3,640 | 3,640 |
| B | do | 3,879 | | | 3,896 | 4,003 |
| A | dimethyl formamide | 4,968 | | | | ¹4,968 |
| B | do | 3,290 | | | | 3,366 |

¹ Surface considerably affected.

What is claimed is:
1. The compound of the formula

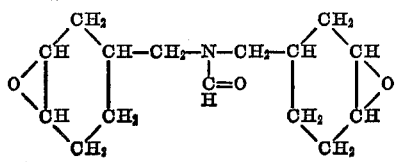

2. The compound of the formula

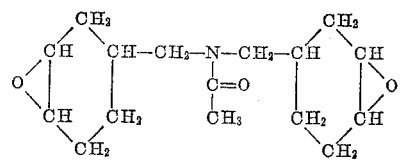

3. The new compound of the formula

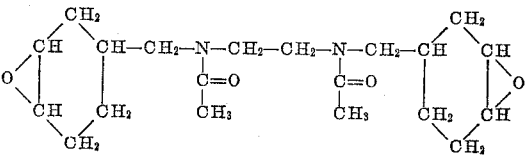

4. Diepoxides of the formula

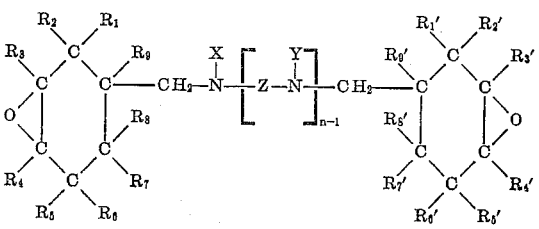

in which $R_1$ and $R_5$ taken together, and $R'_1$ and $R'_5$ taken together, each forms a member selected from the class consisting of two hydrogen atoms, two lower alkyl radicals each having 1 to 4 carbon atoms, and one methylene radical, $R_2$, $R'_2$, $R_3$, $R'_3$, $R_4$, $R'_4$, $R_6$, $R'_6$, $R_7$, $R'_7$, $R_8$, $R'_8$, $R_9$ and $R'_9$, each represents a member selected from the class consisting of a hydrogen atom and a lower alkyl group having 1 to 4 carbon atoms, X and Y each represent a member selected from the class consisting of radicals

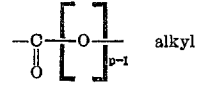 alkyl where alkyl is a straight chain alkyl and where $p$ is an integer of at least 1 and at the most 2,

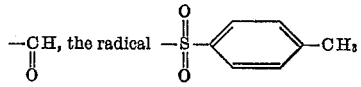

and the cyano group, Z represents a divalent radical selected from the class consisting of alkylene radical containing 2 to 6 carbon atoms and the phenylene radical and $n$ is an integer of at least 1 and of at most 2.

References Cited in the file of this patent

UNITED STATES PATENTS 2,166,971    Schmidt    July 25, 1939
2,745,847    Phillips    May 15, 1956

UNITED STATES PATENT OFFICE
CERTIFICATION OF CORRECTION

Patent No. 2,988,554  June 13, 1961

Hans Batzer et al.

It is hereby certified that error appears in the above numbered patent requiring correction and that the said Letters Patent should read as corrected below.

Column 5, line 65, for '"Aerosil"' read -- ("Aerosil") --; column 7, line 41, for "-$\Delta^3$-" read -- -($\Delta^3$- --; column 8, line 45, for "equivalent" read -- equivalents --; column 9, line 34, for "93.7 parts" read -- 97.3 parts --; column 9, line 71, for the formula "$C_{18}H_{24}N_2$" read -- $C_{16}H_{24}N_2$ --; column 13, in the table, last column, last two items for $$^1 4,968 \quad \text{read} \quad 4,968$$

$$3,366 \quad \quad ^1 3,366$$

Signed and sealed this 28th day of November 1961.

(SEAL)
Attest:

ERNEST W. SWIDER  
Attesting Officer

DAVID L. LADD  
Commissioner of Patents